US007949073B2

(12) United States Patent
Welborn (10) Patent No.: US 7,949,073 B2
(45) Date of Patent: May 24, 2011

(54) DUAL-MODE SYSTEM AND METHOD FOR RECEIVING WIRELESS SIGNALS

(75) Inventor: Matthew L. Welborn, Vienna, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 852 days.

(21) Appl. No.: 11/711,704

(22) Filed: Feb. 28, 2007

(65) Prior Publication Data

US 2008/0207152 A1 Aug. 28, 2008

(51) Int. Cl.
  *H04L 27/00* (2006.01)
(52) U.S. Cl. ......... 375/325; 455/133; 455/144; 375/295
(58) Field of Classification Search .......... 375/316–317, 375/322–325; 329/316–317; 455/130, 132–133, 455/458, 142–143
See application file for complete search history.

(56) References Cited

U.S. PATENT DOCUMENTS

| | | | |
|---|---|---|---|
| 5,239,306 A * | 8/1993 | Siwiak et al. ................. 340/7.35 |
| 5,517,530 A * | 5/1996 | Gardner .......................... 375/325 |
| 5,757,846 A | 5/1998 | Vasudevan | |
| 5,767,738 A | 6/1998 | Brown et al. | |
| 6,349,109 B1 | 2/2002 | Lattard et al. | |
| 6,377,848 B1 * | 4/2002 | Garde et al. ...................... 604/20 |
| 2001/0041584 A1 * | 11/2001 | Watanabe ...................... 455/553 |
| 2003/0003863 A1 * | 1/2003 | Thielecke et al. .............. 455/39 |
| 2004/0076119 A1 * | 4/2004 | Aronson et al. ............... 370/249 |
| 2004/0086066 A1 * | 5/2004 | Schmidt et al. ................ 375/350 |
| 2005/0088980 A1 * | 4/2005 | Olkkonen et al. ............. 370/255 |
| 2005/0277429 A1 * | 12/2005 | Laroia et al. .................. 455/458 |
| 2006/0285578 A1 * | 12/2006 | Weisenhorn et al. .......... 375/130 |
| 2008/0080598 A1 * | 4/2008 | Mo et al. ........................ 375/219 |

FOREIGN PATENT DOCUMENTS

EP 1001551 A2 5/2000

OTHER PUBLICATIONS

International Search Report and Written Opinion for correlating PCT Patent Application No. PCT/US2008/053121 dated Jul. 16, 2008.

* cited by examiner

*Primary Examiner* — David C. Payne
*Assistant Examiner* — James M Perez (57) ABSTRACT

A wireless receiver (100) is provided, comprising: a non-coherent signal detector (130) configured to receive an incoming signal and perform a non-coherent signal analysis in response to a first control signal; a coherent signal detector (140) configured to receive the incoming signal and perform a coherent signal analysis to extract coherently-encoded data from the incoming signal in response to a second control signal; and a receiver circuit (160) configured to process the coherently-encoded data. The non-coherently-encoded data provides an indication as to whether the incoming signal includes the coherently-encoded data, and the coherent signal detector is further configured to enter in a low power sleep state in response to a third control signal.

17 Claims, 6 Drawing Sheets

DUAL-MODE SYSTEM AND METHOD FOR RECEIVING WIRELESS SIGNALS

FIELD OF THE INVENTION

The present invention relates in general to a system and method for receiving both coherently-encoded wireless signals and non-coherently-encoded signals and switching between the two.

BACKGROUND OF THE INVENTION

One large concern for many portable devices is battery power. With a limited power supply, these portable devices often try to limit the amount of power that is used at any given time. One way to accomplish this is to turn off all or part of the device's functions or send them into a sleep mode when they aren't needed. Then, when there is a call for that functionality, the device can waken the necessary circuitry and perform the required action. But when there is no need for that functionality, the circuits can remain off or in the sleep mode, and the level of power consumption for the device will be less than during normal operation.

This tactic can work well for operations that are largely under the control of the user. A display screen on a remote device might be powered down if no action is taken for a set time. Then, when the user once more needs to view something on the display screen, he can reactivate it. Nothing is lost by powering down the screen since nothing critical will happen while the device is powered down. If the at any time user needs to view something, he can simply reactivate the screen. And if the user has to wait a moment for the screen to come back on, nothing critical will be lost.

But some operations are less predictable and more critical, such as wireless communication. A wireless device may not necessarily know when it will receive a signal, and may be required to reply to such signals within a set period of time. As a result the device must remain alert at all times for incoming signals. For example, a cell phone could receive a call at any time; you can't predict when a homeowner might activate a garage door opener; and a wireless router may not be able to predict when it will have to pass data. As a result, a wireless receiver in such a device may have to remain in at least a listen mode for an extended period of time, even if the chance of receiving data is slim.

The level of power consumption for a receiver circuit can vary tremendously depending upon the complexity of the receiver circuit, however. A relatively simple receiver circuit that detects only non-coherent signals is comparatively cheap and low in power consumption. But non-coherent signals are not the most efficient for sending data, and so the use of non-coherent signals can significantly limit data transmission rates. A more complex receiver circuit that detects coherent signals is more expensive and higher in power consumption, but provides for a more efficient signal processing, allowing greater transmission speeds.

It is therefore desirable to provide a way to use the advantages of both coherent and non-coherent signal processing within a single device.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best implemented in integrated circuits (ICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs, if any, will be limited to the essentials with respect to the principles and concepts used by the exemplary embodiments.

Dual Mode Wireless Receiver

Figure 1:
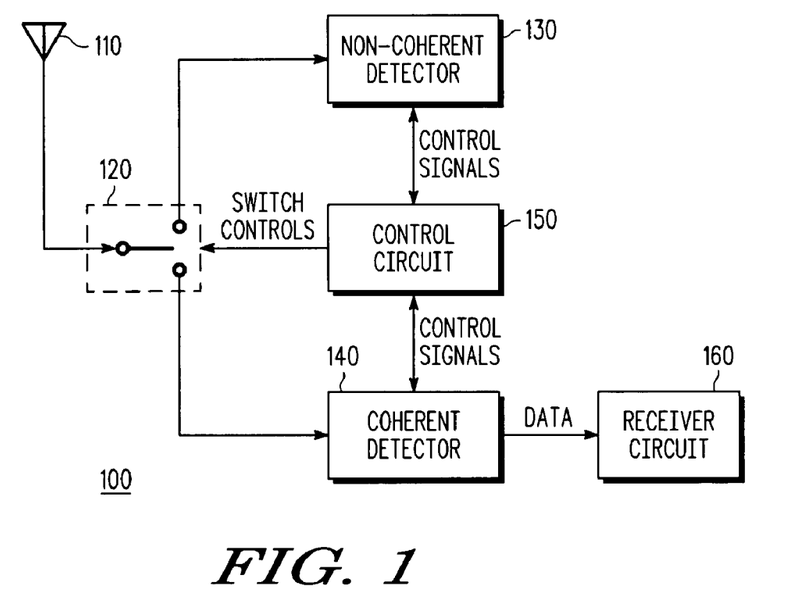
FIG. 1 is a block diagram of a dual-mode wireless receiver according to disclosed embodiments of the present invention.

FIG. 1 is a block diagram of a dual-mode wireless receiver 100 according to a disclosed embodiment of the present invention. As shown in FIG. 1, the wireless receiver 100 includes an antenna 110, an input switch 120, a non-coherent detector 130, a coherent detector 140, a control circuit 150, and a receiver circuit 160. The dual-mode wireless receiver 100 is configured to receive coherently-encoded signals at the coherent detector 140, and to receive either coherently-encoded signals or non-coherently-encoded signals at the non-coherent detector 130.

The antenna 110 operates to receive a wireless signal and pass it to the remainder of the dual-mode wireless receiver 100. The antenna 110 can be any sort of appropriate antenna that can effectively receive both coherently-encoded and non-coherently-encoded signals.

The input switch 120 is connected to the antenna 110 and serves to connect the antenna to either the non-coherent detector 130 or the coherent detector 140, based on switch controls received from the control circuit 150. The input switch 120 can be eliminated in some alternate embodiments, however. In such embodiments the non-coherent detector 130 or the coherent detector 140 could both be connected directly to the antenna 110, or some other isolation mechanism could be employed, e.g., controlling the input impedances of the non-coherent detector 130 or the coherent detector 140.

The non-coherent detector 130 operates to analyze the incoming signal to determine if it contains non-coherently-encoded information. In one embodiment, a non-coherent detector 130 could simply look at the total power sent over the transmission channel and see if it fits one or more known non-coherent patterns.

In some embodiments the non-coherent detector 130 operates simply to determine whether or not an incoming signal contains non-coherently-encoded information. In such embodiments, the non-coherent detector 130 can simply provide a control signal to the control circuit indicating when the incoming signal contains non-coherently-encoded information.

In other embodiments, the non-coherent detector 130 can also operate to extract non-coherently-encoded information from the incoming signal. In this case, the non-coherent detector 130 would be connected to the receiver circuit 160 to pass on the extracted non-coherent data.

The coherent detector 140 operates to analyze the incoming signal to determine if it contains non-coherently-encoded information. Such a coherent detector typically looks at both the power of an incoming signal, and the sign of the signal. It can then look for known coherent patterns or power and polarity. The coherent detector 140 can provide additional control signals to the control circuit indicating when the incoming signal contains coherently-encoded data, and when it does not.

Typical non-coherent detectors 130 are relatively low in power consumption compared to typical coherent detectors 140. However, this is not a requirement. Exemplary implementations of the non-coherent detector 130 and the coherent detector 140 would be understood to one skilled in the art.

The control circuit 150 provides control signals and switch controls to coordinate the operation of the input switch 120, the non-coherent detector 130, and the coherent detector 140. Among other things, it can tell the non-coherent detector 130 and the coherent detector 140 when to turn on and off (or when to go into and out of a sleep mode) to save power.

The receiver circuit 160 receives and processes data from a coherently-encoded signal. However, in alternate embodiments it could be configured to receive data from a non-coherently-encoded signal as well.

Figure 2:
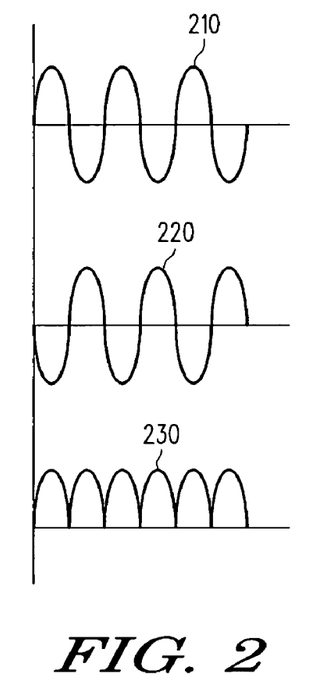
FIG. 2 is a graph of incoming wavelets for a wireless receiver according to disclosed embodiments of the present invention.

FIG. 2 is a graph of incoming wavelets for a wireless receiver according to a disclosed embodiment of the present invention, as shown in FIG. 2, the incoming wavelets in this embodiment are binary-encoded wavelets. In other words, they can be sent in a first orientation 210 or a second orientation 220, inverted from the first orientation.

In this particular embodiment each wavelet is formed from three repeated sinusoids. However, in alternate embodiments different bi-phase wavelet shapes can be used. For example, the wavelet could have more or fewer sinusoids, it could be a Gaussian bi-phase wavelet, or any other suitable bi-phase wavelet. In other embodiments ternary encoding could be employed, in which three states were possible: a first orientation, a second orientation, and no wavelet.

When the coherent detector 140 processes an incoming wavelet, it can determine whether the wavelet is present, and if present, whether it has the first orientation or the second orientation. Data can therefore be encoded into these wavelets, e.g. using binary encoding in which one orientation represents a logical "1" and the other orientation represents a logical "0."

In contrast, the non-coherent detector only sees the total transmission power of a given wavelet; it can't differentiate between the two orientations. As a result, when the non-coherent detector 130 processes the incoming wavelet, it only identifies whether a wavelets is present or not. It effectively views each wavelet as an absolute value signal 230 for the actual wavelet, which in the case of each of the two orientations is the same. Thus, while the coherent detector 140 can detect the presence or absence of the wavelets, and differentiate between two wavelet orientations, the non-coherent detector 130 can only detect the presence or absence of the wavelets (i.e., the presence or absence of signal power).

This means that in order for the non-coherent detector 130 to be able to detect data, there must be wavelet gaps as well as wavelets in an incoming signal. The presence and absence of wavelets can then be used to represent digital "1" and "0" values.

Figure 3:
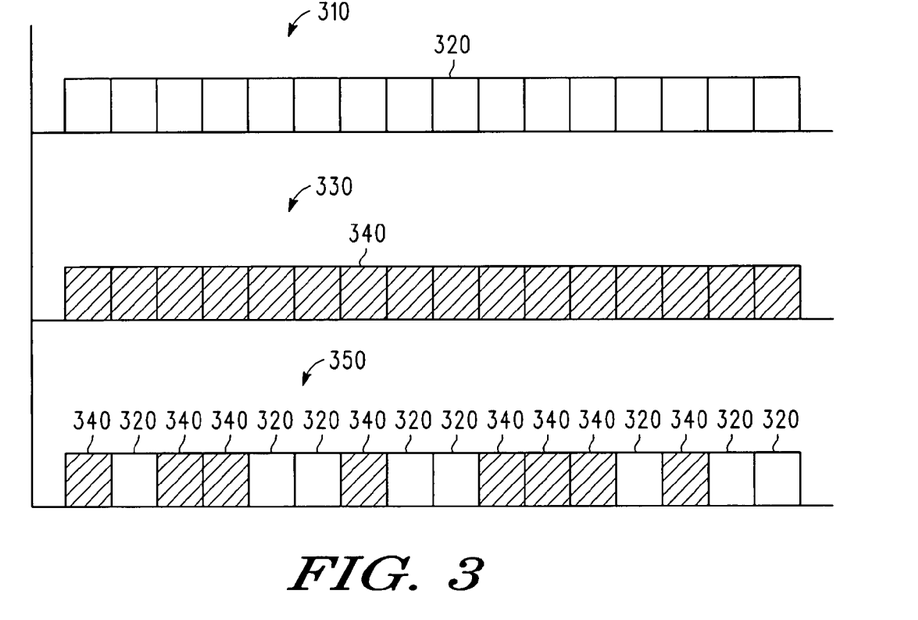
FIG. 3 is a diagram of a portion of a transmitted packet according to disclosed embodiments of the present invention.

FIG. 3 is a diagram of a portion of a transmitted packet according to a disclosed embodiment of the present invention. In particular, FIG. 3 shows examples of an empty packet 310, a coherently-encoded packet 330, and a non-coherently-encoded packet 350.

An empty packet 310 includes a plurality of slots 320, each of which can contain a single wavelet. The exact distribution of wavelets into these slots 320 will vary depending upon what kind of packet is being sent.

If the packet is to be a coherently-encoded packet 330 (i.e., intended to be received only by a coherent detector), it can potentially have a wavelet 340 contained in every slot 320, since each wavelet can itself represent a bit of information.

If, however, the packet is to be a non-coherently-encoded packet 350 (i.e., intended to be received by a non-coherent detector), it must have a mix of wavelets 340 and empty slots 320, since data bits are represented by the presence or absence of wavelets in a slot. This will allow a non-coherent detector 130 to identify the packet as a non-coherently-encoded packet 350.

However, in different embodiments, the wavelets 340 used in a non-coherently-encoded packet 350 can either be non-coherently-encoded wavelets or coherently-encoded wavelets.

If the wavelets 340 are non-coherently-encoded wavelets, then the packet is only non-coherently-encoded and can only be detected as non-coherently-encoded. However, if the wavelets 340 are coherently-encoded wavelets, they can be identified as both a non-coherently-encoded and coherently-encoded. This will allow the signal to either contain two separate data payloads (i.e. a non-coherently-encoded data payload and a coherently-encoded data payload), or to have a set of coherent data encoded using a ternary code.

In different embodiments a transmitter can send a signal including only coherently-encoded packets, only non-coherently-encoded packets, or can send some or all of the packets as dual-encoded packets.

Signal Acquisition

Signal acquisition in a wireless, packet-based system can be performed through the use of packet preambles. A packet preamble is a portion at the beginning of the packet with a known bit pattern. A listening device acquires the signal containing the packet by listening for that known pattern. By identifying the pattern properly, the listening device can acquire the incoming signal and properly decipher the remainder of the packet.

Selecting the size of the preamble is a matter of trading off acquisition effectiveness and transmission speed. In a wireless network, packet size will typically be fixed. This means that the more space devoted to a packet preamble, the less space remains in the packet for other information, e.g., control instructions or data payload. However, the greater the size of the preamble, the greater the chance for successful packet acquisition. It is, therefore, desirable to use a preamble that is just long enough to secure a desired level of acquisition, but no longer.

A coherently-encoded signal typically results in quicker acquisition, allowing a relatively small preamble size to be selected. But listening for coherent signals generally consumes a relatively large amount of power Therefore, it is also desirable, particularly with respect to devices with a limited power supply, to limit the amount of time spent listening for coherent signals.

One way to limit the time spent listening for coherent signals would be to turn on a listening device's coherent detector only when a data packet was actually being sent. Unfortunately, a listening device doesn't always know when other transmitting devices will be sending data packets. Therefore, the listening device may have to remain in a listening mode for a long time, even when no data packets are-being transmitted.

But by using a system in which data packets may be either coherently-encoded, non-coherently encoded, or dually-encoded (i.e., both coherently and non-coherently encoded), the disclosed system can provide greater flexibility with respect to signal acquisition. Such a system can have multiple possible packet formats, each with a different type and size of preamble.

This allows a receiving device to listen in a low-power non-coherent mode until it identifies an incoming signal. Then it can switch over to a coherent mode to get greater transmission speeds. If the incoming signal is a dually-encoded signal, the receiver can just switch over listening modes; and if it's a solely non-coherently-encoded signal, the receiver will have to request a change to the coherent mode.

Figure 4:
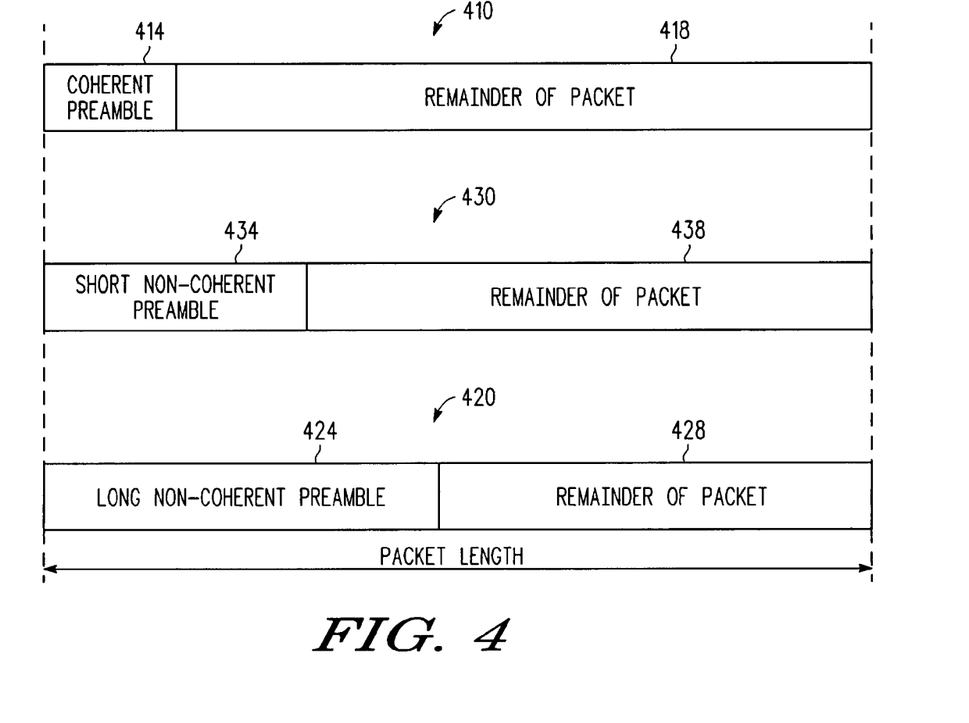
FIG. 4 is a comparison of different data packets with different preambles, according to disclosed embodiments of the present invention.

FIG. 4 is a comparison of different data packets with different preambles, according to a disclosed embodiment of the present invention. As shown in FIG. 4, this embodiment allows for three different data packet formats, although alternate embodiments could use greater or fewer numbers of packet formats. The three data packet formats provided in the embodiment of FIG. 4 include a fully-coherent packet 410, a robust non-coherent packet 420, and a lean non-coherent packet 430. Generally a transmitter can't change between a coherent and non-coherent mode during the transmission of a packet, but can only do it between packet transmissions.

The fully-coherent packet 410 is transmitted in a coherent mode, and has a fully-coherent preamble 414 and correspondingly large remainder of the packet 418. The robust non-coherent packet 420 is transmitted in a non-coherent mode, and has a relatively long non-coherent preamble 424, and correspondingly small remainder of the packet 428. The lean non-coherent packet 430 is transmitted in a non-coherent mode, and has a relatively short non-coherent preamble 424, which allows for a remainder of the packet 438 that is larger than the remainder of the packet 428 with a long non-coherent preamble 424, but shorter than the remainder of the packet 418 with a coherent preamble 414.

A transmitting device could use each of these packets in different situations. For example, the fully-coherent packet 410 could be used when the receiver knows that packet data is coming and can turn on a coherent receiver. The receiver could then use lean non-coherent packets and robust non-coherent packets when it was uncertain whether a receiver would have a coherent or a non-coherent detector active. The lean non-coherent format might be a default for non-coherent operation, with the robust non-coherent format being used when more robust operation is required.

It should be noted that the robust non-coherent packet 420 and the lean non-coherent packet 430 can either be non-coherently encoded or dually encoded, depending upon the embodiment. If the robust non-coherent packet 420 and the lean non-coherent packet 430 are non-coherently encoded, then their packet remainder 428 and 438 can only contain payloads that have non-coherently-encoded data. If, however, the robust non-coherent packet 420 and the lean non-coherent packet 430 are dually encoded, they can contain payloads that have both non-coherently-encoded data and coherently-encoded data.

Alternate Dual-Mode Wireless Receivers

Although the embodiment of FIG. 1 contains a control circuit 150, alternate embodiments can move this functionality directly to the non-coherent detector and the coherent detector.

Figure 5:
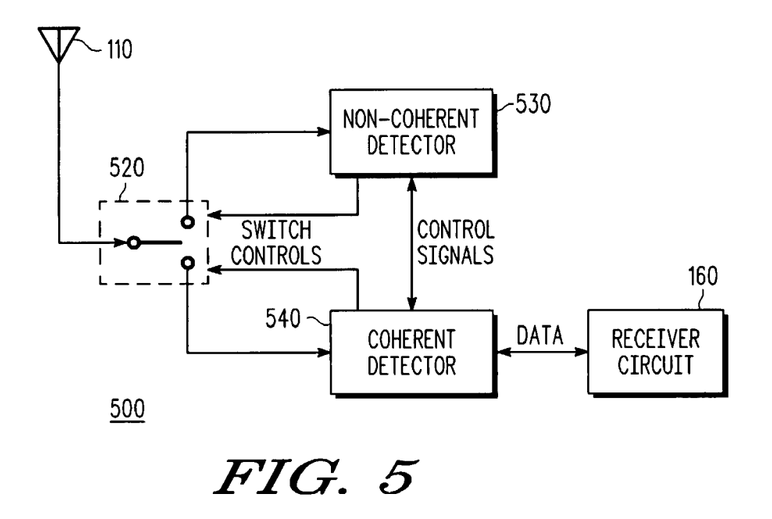
FIG. 5 is a block diagram of an alternate dual-mode wireless receiver according to disclosed embodiments of the present invention.

FIG. 5 is a block diagram of an alternate dual-mode wireless receiver 500 according to disclosed embodiments of the present invention. As shown in FIG. 5, the wireless receiver 500 includes an antenna 110, an input switch 120, a non-coherent detector 530, a coherent detector 540, and a receiver circuit 160.

The antenna 110, the input switch 120, and the receiver circuit 160 operate as described above with respect to FIG. 1. The non-coherent detector 530 and the coherent detector 540 each operate as described above with respect to the corresponding non-coherent detector 130 and coherent detector 140 of FIG. 1, except that each of them communicates directly with the other, and one or both provides the switch controls.

In one exemplary embodiment, the non-coherent detector 530 provides control signals to wake the coherent detector 540, and the coherent detector 540 provides control signals to the non-coherent detector 530 to start it up again after a coherent signal is fully received.

In addition, although in the embodiment of FIG. 1 it is only the coherent detector that is capable of extracting data, alternate embodiments can be configured to extract data from both coherent signals and non-coherent signals.

Figure 6:
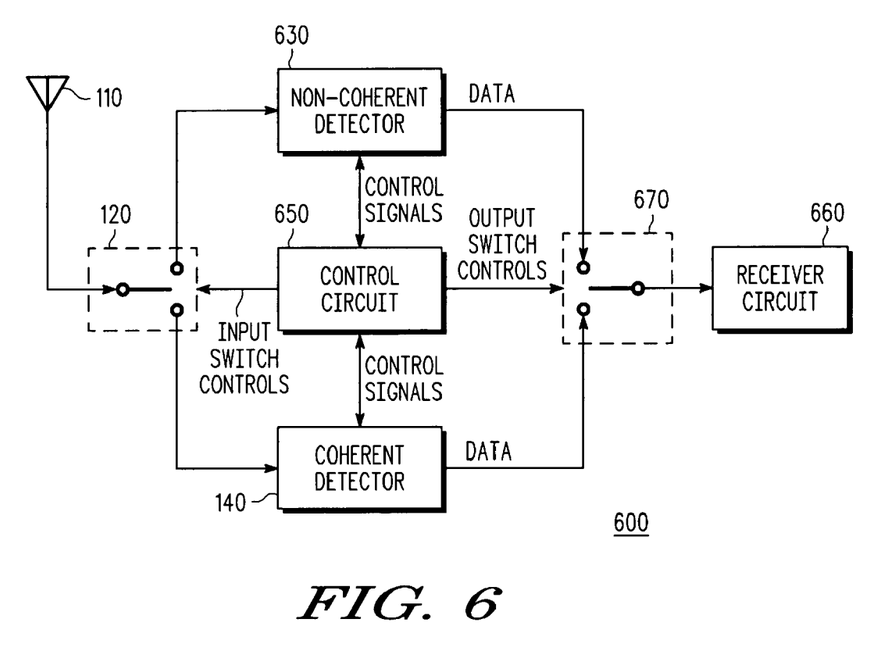
FIG. 6 is a block diagram of a dual-mode wireless receiver of coherent and non-coherent data reception according to disclosed embodiments of the present invention.

FIG. 6 is a block diagram of a dual-mode wireless receiver 600 capable of coherent and non-coherent data reception according to disclosed embodiments of the present invention. As shown in FIG. 6, the wireless receiver 600 includes an antenna 110, an input switch 120, a non-coherent detector 630, a coherent detector 140, a control circuit 650, a receiver circuit 660, and output switch 670.

The antenna 110, the input switch 120, and the coherent detector 140 operate as described above with respect to FIG. 1.

The non-coherent detector 630 operates as described above with respect to the corresponding non-coherent detector 130 of FIG. 1, except that in addition to simply detecting the presence or absence of a non-coherent signal, it is also capable of extracting non-coherently-encoded data from a non-coherent signal.

The control circuit 650 operates as described above with respect to the corresponding control circuit 150 of FIG. 1, except that it provides both input switch controls to the input switch 120 and output switch controls to the output switch 670, and provides control signals to the non-coherent detector 630 and the coherent detector 140 that instruct each with respect to when to listen for signals and when to extract data from the signals.

The receiver circuit 660 operates as described above with respect to the corresponding receiver circuit 160 of FIG. 1, except that its data source can come from either the non-coherent detector 630 or the coherent detector 140, which may or may not require additional circuitry.

The output switch 670 connects the receiver circuitry 660 to either the non-coherent detector 630 or the coherent detector 140 based on the output switch controls from the control circuit 650. The output switch 670 can be eliminated in some alternate embodiments, however. In such embodiments the non-coherent detector 630 or the coherent detector 140 could both be connected directly to the receiver circuitry 660, or some other isolation mechanism could be employed, e.g., controlling the output impedances of the non-coherent detector 630 or the coherent detector 140.

In addition, further variations of a dual-receiver can be provided. For example, the embodiment of FIG. 6 could be further modified to remove the control circuit 650 and bring its functionality directly to the non-coherent detector 630 and the coherent detector 140.

In general, a wireless receiver is provided, comprising: a non-coherent signal detector configured to receive an incoming signal and perform a non-coherent signal analysis in response to a first control signal; a coherent signal detector configured to receive the incoming signal and perform a coherent signal analysis to extract coherently-encoded data from the incoming signal in response to a second control signal; and a receiver circuit configured to process the coherently-encoded data. The non-coherently-encoded data provides an indication as to whether the incoming signal includes the coherently-encoded data, and the coherent signal detector is further configured to enter in a low power sleep state in response to a third control signal.

The wireless receiver may further comprise an antenna configured to provide the incoming signal to the non-coherent signal detector and the coherent signal detector. One control signal may be used as both the second control signal and the third control signal.

The wireless receiver may further comprise an input switching element configured to connect the incoming signal to one of the non-coherent signal detector and the coherent signal detector based on an input control signal. The coherent signal detector may be configured to enter into the low-power sleep mode when the non-coherent signal detector is in operation. The wireless receiver may further comprise a control circuit configured to provide the first and second control signals.

The non-coherently-encoded signal analysis may comprise detecting whether the incoming signal is present on a wireless channel. The coherent signal detector may be configured to generate the first control signal based on whether the coherent signal detector is in the sleep mode, and the non-coherent signal detector may be configured to generate the second control signal based on whether the incoming signal is present on the wireless channel.

The non-coherently-encoded signal analysis may comprise extracting non-coherently-encoded data from the incoming signal. The wireless receiver may further comprise an input switching element configured to provide one of the non-coherently-encoded data and the non-coherently-encoded data to the receiver circuit based on a mode control signal. In this case, the receiver circuit may also be configured to process the non-coherently-encoded data. The incoming signal may comprise codewords that define the coherently-encoded data and the non-coherently-encoded data. The non-coherent signal detector may extract binary data from each of the codewords. And the coherent signal detector may extract ternary data from each of the codewords.

The wireless receiver may be implemented in an integrated circuit.

Method of Operating Wireless Receiver Device

Figure 7:
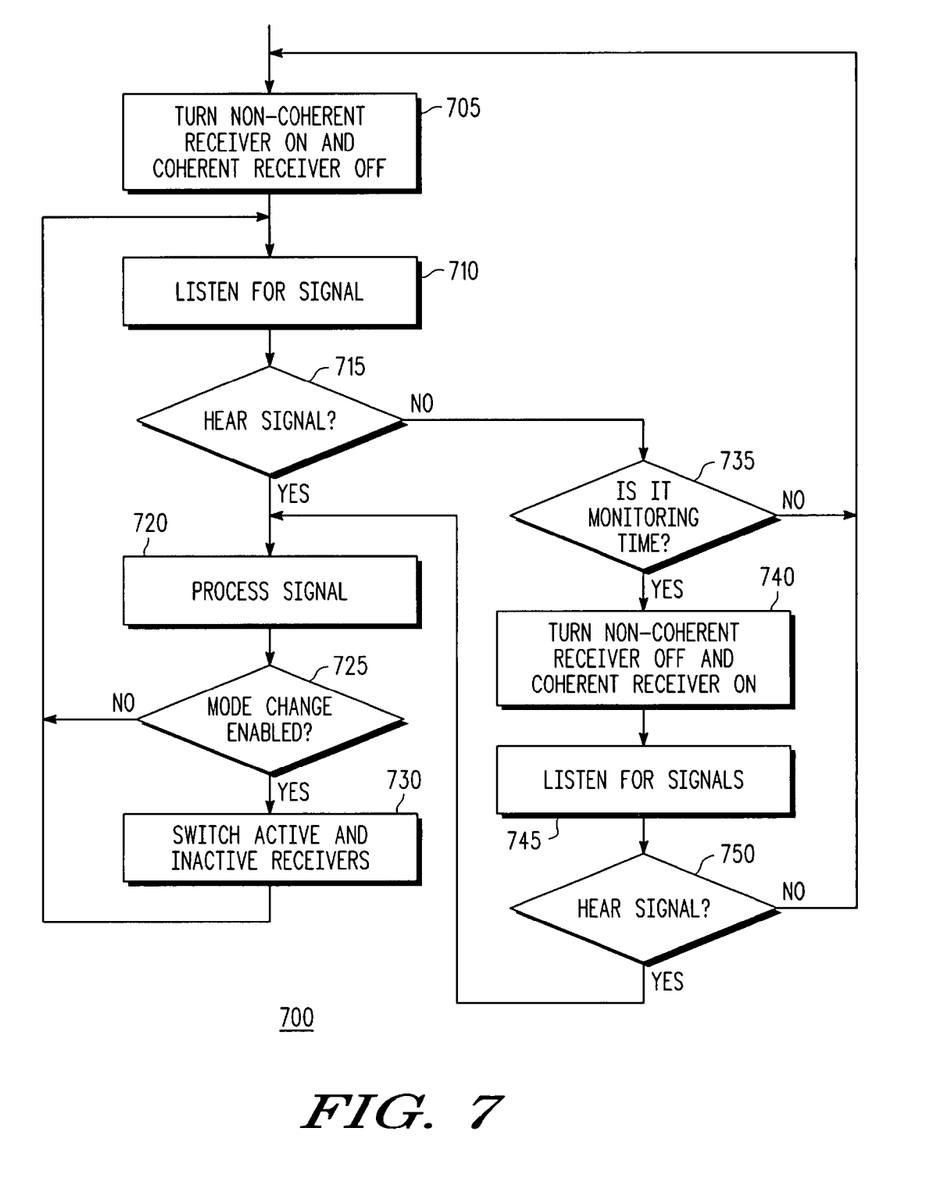
FIG. 7 is a flow chart of a method of operating a receiver device according to disclosed embodiments of the present invention.

The wireless receivers of FIGS. 1, 5, and 6 can be used to monitor for incoming signals in a manner that keeps power consumption relatively low. FIG. 7 is a flow chart of a method of operating a receiver device according to disclosed embodiments of the present invention.

As shown in FIG. 7, the receiving operation begins when the receiver turns a non-coherent receiver on and a coherent receiver off (705). The coherent receiver can then be turned off or put into a low-power sleep mode. This allows the device to conserve power, since a non-coherent receiver generally consumes less power than a coherent receiver.

The active receiver (i.e., the non-coherent receiver at this point) then listens for an incoming signal (710), and determines whether it hears a signal (715). This can be done using an acquisition process in which the active receiver looks for an identifiable preamble.

If the active receiver hears a signal, then it will proceed to process the signal (720). If the receiving device is capable of extracting data from the incoming signal type, it may do so at this point. If, however, the receiving device is not capable of extracting data from the incoming signal type (e.g., it may only identify the presence of a non-coherent signal, for example), then this processing may simply involve identifying the incoming signal as a being present.

After the signal is processed, the active receiver then determines if a mode change is enabled by the received signal (725). In some embodiments the mode change is enabled by a passive trigger (e.g., the fact that a non-coherent signal was received, the fact that a packet has ended, etc.). In other embodiments, some kind of active trigger may be required (e.g., an explicit request in a received packet).

If a mode change is not enabled, then the operation proceeds to continue listening for a signal (710). If, however, a mode change is enabled, the receiver switches the active and inactive receivers (e.g., turns off the non-coherent receiver and turns on the coherent receiver, or turns on the non-coherent receiver and turns off the coherent receiver) (730) If this switch is to a coherent mode, there should not be any needless consumption of power since the receiver knows that data is incoming.

Once the mode is changed, the receiver then proceeds to continue listening for more signals (710), except now it's listening in a new mode.

If, however, the receiver does not hear a signal (715), then it has no signal to process. It can, in some embodiments, then check whether it is time to monitor in a coherent mode regardless of the fact that no signals have been received (735). It may be that there are some transmitting devices that are not capable or willing to transmit in a non-coherent mode. It may, therefore, be desirable in some embodiments to periodically enter into a coherent mode to listen for signals.

If the receiver then determines that it is a valid monitoring time, then the receiver will listen for a signal according to some set parameters (745), and determine whether it can hear a signal (750). In one embodiment, the receiver may have a set time that it will listen for coherent signals.

If the receiver (now in coherent mode) does hear a signal, it will then process the signal (720), and proceed accordingly. If, however, the receiver does not hear a signal, it will then set the non-coherent receiver as active and the coherent receiver as inactive (705) and continue to listen for more incoming signals (710).

In any embodiment where there is no set monitoring time, it is possible to eliminate operations 735, 740, 745, and 750.

Once the coherent receiver has been activated, the operation of listening for a signal (715) should generally result in a signal being heard. This is because the mode change is generally enabled when a coherently-encoded signal is either expected or already incoming.

Once the coherent signal (or dual signal) is completely received, however, there are two main ways for the receiver to return to the non-coherent mode and set the coherent receiver to sleep again. In some embodiments, the last coherent data packet could instruct a mode change (e.g., as determined in operation 725). In other embodiments, no explicit instruction may be given. But in such a case, the receiver will stop hearing a signal (715). And as long as this doesn't happen to occur during a monitoring time (735), or if the monitoring time is set to only be measured during a non-coherent mode, the processing will proceed to appoint where the coherent receiver is deactivated and the non-coherent receiver is reactivated (705).

In some embodiments, the processing of a signal (720) may involve processing less than an entire packet. For example, in some embodiments, an incoming dual-mode signal may be identified during its preamble using a non-coherent detector. But once the signal is processed sufficiently to identify that it's a packet, the receiver switches to a coherent mode, and uses a coherent detector to read the remainder of the packet.

In any situation in which the process requires the receiver to make a mode change to a setting that is currently active, no additional processing need be done, and that operation is considered completed. For example if the receiver were in the non-coherent mode already when it moved to the operation of setting the non-coherent receiver active and the non-coherent receiver inactive (710), the receiver need take no further action in this operation, and can proceed directly to listening for a signal (710).

It is also possible in some embodiments to simply keep the non-coherent receiver operating all the time. It may be that the added power cost of keeping the non-coherent receiver constantly on is outweighed by the savings in complexity for not having to determine when to activate and deactivate it. In this case it may be isolated during a coherent mode, and then reconnected during a non-coherent mode.

In general, a method of operating a wireless receiver is provided, comprising: activating a non-coherent signal detector; monitoring a wireless medium for an incoming signal sent from a remote wireless transmitter; receiving the incoming signal; performing a non-coherent signal analysis on the incoming signal to determine whether the incoming signal is in a coherently-encoded format that includes coherent data; and activating a coherent signal detector if the incoming signal is in the coherently-encoded format.

The method may further comprise performing a coherent signal analysis on the incoming signal to extract data from the incoming signal after activating the coherent signal detector.

The incoming signal may be in a dual encoded format that includes both the coherent data and non-coherent data.

The method may further comprise performing a non-coherent signal analysis on the incoming signal to extract data from the incoming signal if the incoming signal is not in the coherently-encoded format. The method may also further comprise: monitoring an operating time of the non-coherent receiver; and periodically activating the coherent signal detector regardless of whether the incoming signal is in the coherently-encoded format, based on the operating time.

The method may be implemented in an integrated circuit.

Method of Operating Wireless Transmitter Device

Figure 8:
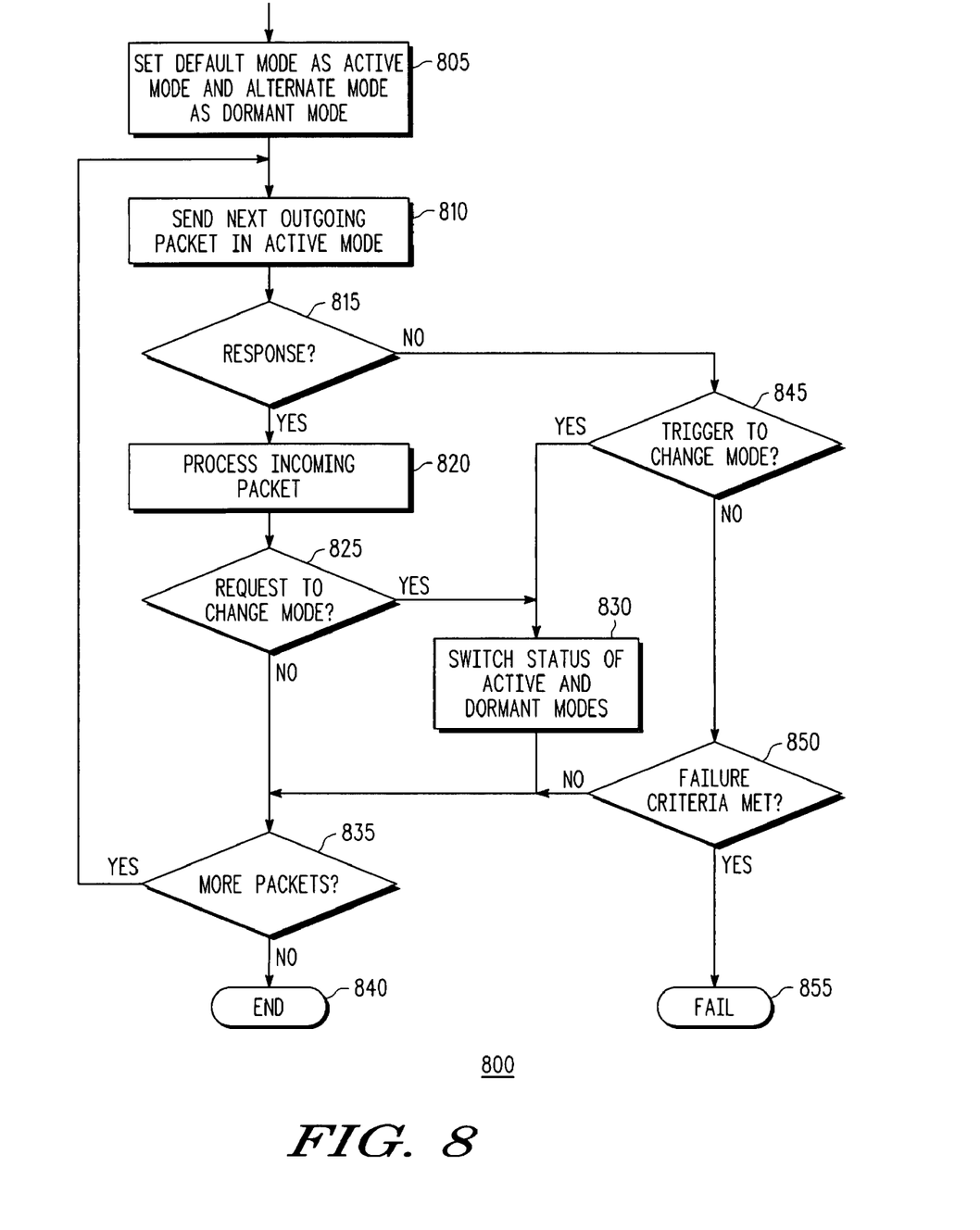
FIG. 8 is a flow chart of a method of operating a transmitter device according to disclosed embodiments of the present invention.

Wireless transmitters can likewise be configured to take advantage of the multiple receiving modes. FIG. 8 is a flow chart of a method of operating a transmitter device according to disclosed embodiments of the present invention.

As shown in FIG. 8, the operation begins in the transmitter when a default mode is set as the active mode and an alternate mode is set as a dormant mode (805). For example, if the system wants to allow receivers to operate using low power, the default mode may be either a non-coherent mode or a dual mode (which may be detected by a non-coherent detector), and the alternate mode may be a coherent mode.

The transmitter then sends its next outgoing packet in the active mode (810), and determines whether it receives a response to that packet (815). This response could be a return packet, an acknowledgement packet, etc.

If the transmitter receives a response, it processes the incoming packet (820) and determines whether the incoming packet includes a request to change modes (825). In some embodiments the receiver might wish to enter a different mode. This might be to move to a faster mode for higher data throughput (e.g., in a coherent mode), or to move to a less power consumptive mode (e.g., a non-coherent mode) to reduce power consumption at the receiving end.

If the incoming packet does include a request to change modes, the transmitter will switch the status of the active and dormant modes (830) and determine whether there are more packets to send (835). If the incoming packet does not include a request to change modes, the transmitter will simply determine whether there are more packets to send (835).

Regardless of what mode the transmitter is in, if there are no more packets, the transmission process ends (840). If, however, there are more packets, then the transmitter proceeds to send the next packet (810), and starts the process all over again.

If the transmitter did not receive a response to its outgoing packet (815), it then determines whether there is any kind of trigger to change the operational mode. For example, the failure to receive a response while in a non-coherent mode could be the trigger to switch to a coherent mode, or vice versa. Alternatively, a failure to receive a response over a certain number of packets or over a certain period of time would be a trigger to move from one mode to another.

Regardless, if the transmitter determines that there was a mode-change trigger, it will switch the status of the active and dormant modes (830) and determine whether there are more packets to send. (835).

If the transmitter determines that there was no mode-change trigger, it then determines whether a set of failure criteria have been met (850). This may occur, for example, when the transmitter is in the easiest-to-receive mode and still gets no response. Or it may occur when no response is heard for a certain period of time or for a certain number of packets.

If the transmitter determines that the failure criteria were met, then it enters a failure mode and proceeds accordingly. This could involve sending an error message, logging the data for another transmission attempt at a later date, etc. If, however, the failure criteria have not been met, the transmitter simply determines whether there are more packets to send (835) and proceeds accordingly.

In general, a method of transmitting wireless signals is provide, comprising: setting a primary non-coherent transmission mode as an active transmission mode; sending a first packet over a wireless medium in the primary non-coherent transmission mode; switching the active transmission mode to a coherent transmission mode in response to a coherent mode-changing instruction; and sending a second packet over the wireless medium in the coherent transmission mode.

The primary non-coherent transmission mode may be a dual-encoded mode that includes both coherently-encoded data and non-coherently-encoded data. The coherent mode-changing instruction may be one of a coherent mode-changing request contained in an incoming packet from a remote device, or a local coherent mode-changing trigger generated in response to operational measurements. The operational criterion may be an elapsed time that the non-coherent transmission mode has been the active transmission mode.

The method may further comprise switching the active transmission mode to a secondary non-coherent transmission mode in response to a non-coherent mode-changing instruction; and sending a third packet over the wireless medium in the secondary non-coherent transmission mode. The switching of the active transmission mode to the secondary non-coherent transmission mode may take place prior to the switching of the active transmission mode to the coherent transmission mode, the sending of the third packet may take place prior to the sending of the second packet, and a secondary preamble employed in the secondary non-coherent transmission mode may be shorter than a primary preamble employed in the primary non-coherent transmission mode.

The non-coherent mode-changing instruction may be one of a non-coherent mode-changing request contained in an incoming packet from a remote device, or a local non-coherent mode-changing trigger generated in response to operational measurements.

The default mode may be a non-coherent transmission mode, and the alternate mode may be a coherent transmission mode.

The method may be implemented in an integrated circuit.

Increased Operational Modes

In the embodiment of FIG. 8, the transmitter has two potential operational modes (i.e., the default mode and the alternate mode). Other embodiments can employ a greater number of potential modes. For example there could be more than one coherent mode, or more than one non-coherent mode, each with a varying type of preamble (e.g., using a different size, different encoding style, varying codes, etc.). One skilled in the art would understand how to extend the flow chart of FIG. 8 to accommodate increased numbers of operational modes. However, this operation can also be illustrated with a state diagram.

Figure 9:
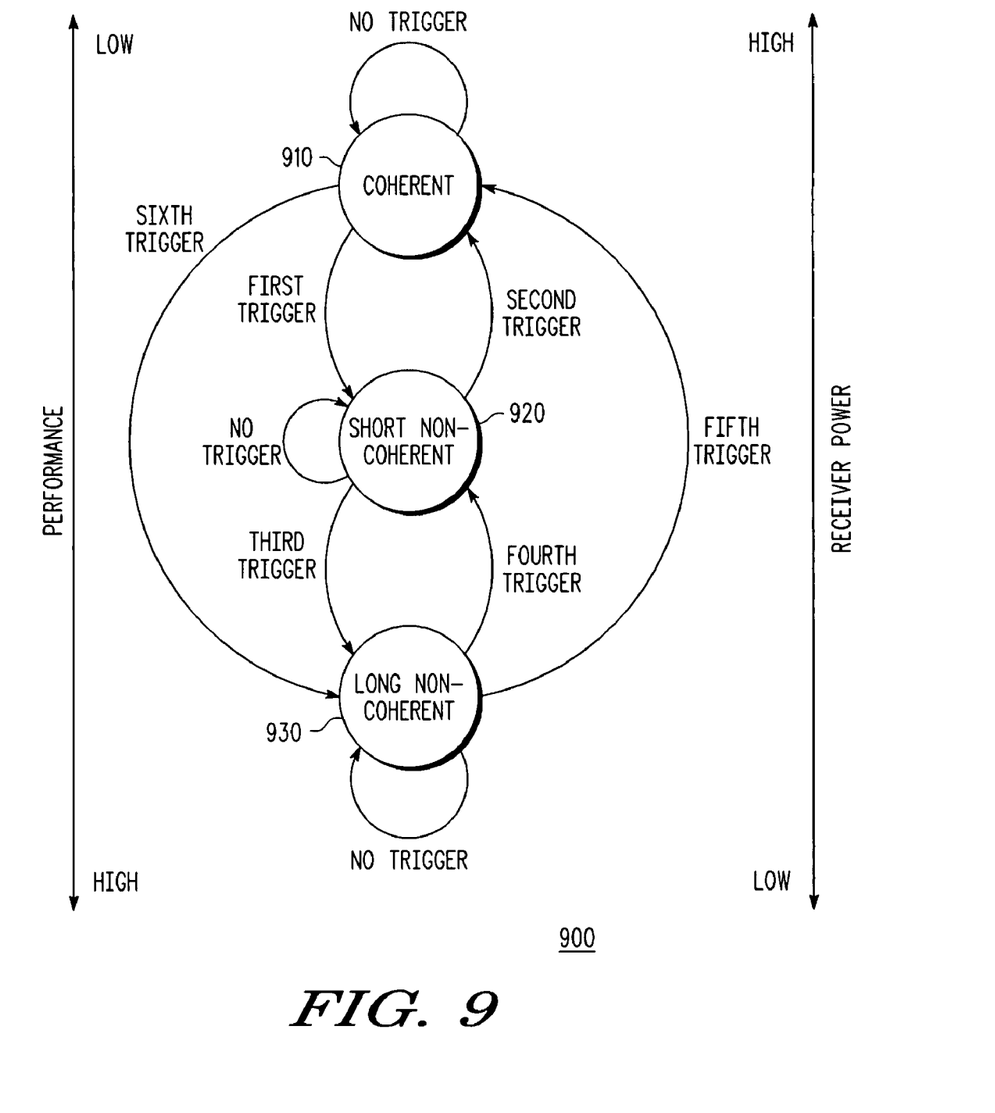
FIG. 9 is a state diagram showing the operation of a transmitter device according to disclosed embodiments of the present invention.

FIG. 9 is a state diagram showing the operation of a transmitter device according to disclosed embodiments of the present invention. As shown in FIG. 9. this embodiment corresponds to the three-mode system disclosed in FIG. 4. Alternate embodiments that have more or fewer operational modes will have a correspondingly greater or smaller number of states. The movement between states can happen in a manner corresponding to that shown in FIG. 9, except with a different number of possible states.

As shown in FIG. 9, each mode has one or more triggers that will cause it to move to a different mode. These can be active triggers (e.g., requiring an active request on the part of a device, the detection of an incoming signal of a set encoding system, etc.), or passive triggers (e.g., set by the passage of time or some other criteria).

FIG. 9 discloses three operational modes: a coherent mode 910, a short non-coherent mode 920 (i.e., a lean non-coherent mode), and long coherent mode 930 (i.e., a robust non-coherent mode).

When in the coherent mode 910, the first trigger will move operation to the short non-coherent mode 920, while the sixth trigger will move operation to the long non-coherent mode 930. When in the short non-coherent mode 920, the second trigger will move operation to the coherent mode 910, while the third trigger will move operation to the long non-coherent mode 930. And when in the long non-coherent mode 930, the fourth trigger will move operation to the short non-coherent mode 920, while the fifth trigger will move operation to the coherent mode 910. Thus, over the course of time, by monitoring the various triggers, the transmitter can settle on the most efficient operational mode for a given system.

In alternate embodiments some of the triggers may be eliminated. For example, it may not be possible to move to every other mode from any given mode. It may be necessary to follow a set path or paths to change modes. For example, to get from the coherent mode 910 to the long non-coherent mode 930, it may be necessary to pass through the short non-coherent mode 920 first.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A wireless receiver, comprising:
   a non-coherent signal detector configured to receive an incoming data packet, the data packet having a preamble portion and a remainder portion, and perform a non-coherent signal analysis on the preamble portion to extract non-coherently-encoded data in response to a first control signal;
   a control circuit configured to generate the first control signal, a second control signal, a third control signal, and an input control signal;
   a coherent signal detector configured to receive the incoming data packet and to perform a coherent signal analysis on the remainder portion to extract coherently-encoded data from the incoming data packet in response to the second control signal;

a receiver circuit configured to process the coherently-encoded data; and an input switching element configured to connect the incoming signal to one of the non-coherent signal detector and the coherent signal detector based on the input control signal, wherein the non-coherently-encoded data provides an indication as to whether the remainder portion of the incoming data packet includes the coherently-encoded data, wherein the coherent signal detector is further configured to enter in a low power sleep state in response to the third control signal, and wherein the preamble portion is non-coherently-encoded to include non-coherently-encoded data and the remainder portion is dually-encoded to simultaneously include both coherently-encoded data and non-coherently-encoded data.

2. The wireless receiver of claim 1, wherein one control signal is used as both the second control signal and the third control signal.

3. The wireless receiver of claim 1, wherein the coherent signal detector is configured to enter into the low-power sleep mode when the non-coherent signal detector is in operation.

4. The wireless receiver of claim 1, wherein the non-coherently-encoded signal analysis comprises detecting whether the incoming signal is present on a wireless channel.

5. The wireless receiver of claim 4,
wherein a first part of the control circuit is formed in the coherent signal detector, and a second part of the control circuit is formed in the coherent signal detector,
wherein the first part of the control circuit is configured to generate the first control signal based on whether the coherent signal detector is in the sleep mode, and
wherein the second part of the control circuit is configured to generate the second control signal based on whether the incoming signal is present on the wireless channel.

6. The wireless receiver of claim 1, wherein the non-coherently-encoded signal analysis comprises extracting non-coherently-encoded data from the incoming signal.

7. The wireless receiver of claim 6,
wherein the input switching element is configured to provide one of the coherently-encoded data and the non-coherently-encoded data to the receiver circuit based on a mode control signal provided by the control circuit,
wherein the receiver circuit is also configured to process the non-coherently-encoded data.

8. The wireless receiver of claim 6,
wherein the incoming signal comprises codewords that simultaneously define the coherently-encoded data and the non-coherently-encoded data,
wherein the non-coherent signal detector can extract binary data from each of the codewords, and
wherein the coherent signal detector can extract ternary data from each of the codewords.

9. The wireless receiver of claim 1, wherein the wireless receiver is implemented in an integrated circuit.

10. A method of operating a wireless receiver, comprising:
activating a non-coherent signal detector;
monitoring a wireless medium for an incoming data packet sent from a remote wireless transmitter, the data packet containing a preamble portion and a remainder portion;
receiving the incoming data packet;
performing a non-coherent signal analysis on the preamble portion of the incoming data packet to determine whether the remainder portion of the incoming data packet is in a dually-encoded format that simultaneously includes both non-coherent and coherent data; and
activating a coherent signal detector and deactivating the non-coherent signal detector when non-coherent signal analysis of the preamble portion determines that the remainder portion of the incoming data packet is in the dually-encoded format.

11. The method of claim 10, further comprising performing a coherent signal analysis on the incoming signal to extract data from the incoming signal after activating the coherent signal detector.

12. The method of claim 10, further comprising performing a non-coherent signal analysis on the incoming signal to extract data from the incoming signal.

13. The method of claim 10, further comprising:
monitoring an operating time of the non-coherent receiver; and
periodically activating the coherent signal detector based on the operating time.

14. A method of transmitting wireless signals from a wireless transmitting device, comprising:
setting a primary non-coherent transmission mode as an active transmission mode;
sending a first outgoing packet over a wireless medium in the primary non-coherent transmission mode;
receiving an incoming packet from a remote device;
switching the active transmission mode to a coherent transmission mode in response to a coherent mode-changing instruction contained in the incoming packet;
sending a second outgoing packet over the wireless medium in the coherent transmission mode;
switching the active transmission mode to a secondary non-coherent transmission mode in response to a non-coherent mode-changing instruction; and
sending a third outgoing packet over the wireless medium in the secondary non-coherent transmission mode,
wherein the switching of the active transmission mode to the secondary non-coherent transmission mode takes place prior to the switching of the active transmission mode to the coherent transmission mode,
wherein the sending of the third outgoing packet takes place prior to the sending of the second outgoing packet, and
wherein a secondary preamble employed in the secondary non-coherent transmission mode is shorter than a primary preamble employed in the primary non-coherent transmission mode.

15. The method of claim 14, wherein the primary non-coherent transmission mode is a dual-encoded mode that includes both coherently-encoded data and non-coherently-encoded data.

16. The method of claim 14, wherein the non-coherent mode-changing instruction is one of a non-coherent mode-changing request contained in an incoming packet from the remote device, or a local non-coherent mode-changing trigger generated in response to operational measurements.

17. The method of claim 14,
wherein a default mode is a non-coherent transmission mode, and
wherein an alternate mode is a coherent transmission mode.

* * * * *